US007188776B2

(12) United States Patent
Schumacher et al.

(10) Patent No.: US 7,188,776 B2
(45) Date of Patent: Mar. 13, 2007

(54) METHOD AND DEVICE FOR PERSONALIZING LUMINESCENT MARKS OF AUTHENTICITY

(75) Inventors: Mattias Schumacher, Borchen (DE); Dirk Fischer, Paderborn (DE)

(73) Assignee: Orga Systems GmbH, Paderborn (DE)

( * ) Notice: Subject to any disclaimer, the term of this patent is extended or adjusted under 35 U.S.C. 154(b) by 60 days.

(21) Appl. No.: 10/381,462

(22) PCT Filed: Aug. 1, 2001

(86) PCT No.: PCT/EP01/08879

§ 371 (c)(1),
(2), (4) Date: Sep. 2, 2003

(87) PCT Pub. No.: WO02/26507

PCT Pub. Date: Apr. 4, 2002

(65) Prior Publication Data

US 2005/0098636 A1 May 12, 2005

(30) Foreign Application Priority Data

Sep. 29, 2000 (DE) ................................ 100488129

(51) Int. Cl.
*G06K 19/06* (2006.01)

(52) U.S. Cl. ........................................................ 235/491

(58) Field of Classification Search ................ 235/491, 235/494, 488, 439
See application file for complete search history.

(56) References Cited

U.S. PATENT DOCUMENTS

| | | | | | |
|---|---|---|---|---|---|
| 3,744,877 | A | * | 7/1973 | Stamm | 359/242 |
| 4,663,518 | A | | 5/1987 | Borror et al. | |
| 4,812,171 | A | * | 3/1989 | Brettle et al. | 523/161 |
| 6,107,010 | A | * | 8/2000 | Corniglion et al. | 430/333 |
| 6,259,524 | B1 | * | 7/2001 | Hofstraat et al. | 356/243.4 |
| 6,475,648 | B1 | * | 11/2002 | Hatwar et al. | 428/690 |
| 6,616,964 | B1 | * | 9/2003 | Hampp et al. | 427/7 |
| 6,858,323 | B1 | * | 2/2005 | Giering et al. | 283/92 |
| 2005/0102464 | A1 | * | 5/2005 | Fannasch et al. | 711/1 |

FOREIGN PATENT DOCUMENTS

| | | | | |
|---|---|---|---|---|
| DE | 100 11 486 | A | | 3/2001 |
| DE | 199 55 383 | A | | 3/2001 |
| EP | 430810 | A1 | * | 6/1991 |
| JP | 11344376 | A | * | 12/1999 |
| KR | 2002096025 | A | * | 12/2002 |
| WO | WO 89 05730 | A | | 6/1989 |

* cited by examiner

*Primary Examiner*—Uyen-Chau N. Le
(74) *Attorney, Agent, or Firm*—Foley & Lardner LLP

(57) ABSTRACT

A method and device for personalizing the luminescent authenticity features on data carrier, in particular plastic cards. The luminescent authenticity feature being applied to or incorporated in a composite card and the authenticity feature is personalized with a high-energy beam in that the intensity and/or wavelength of the beam is chosen such that local bleaching of the structure of the authenticity feature takes place.

17 Claims, 2 Drawing Sheets

METHOD AND DEVICE FOR PERSONALIZING LUMINESCENT MARKS OF AUTHENTICITY

BACKGROUND

1. Field of the Invention

This application relates to a method and apparatus for personalizing luminescent authenticity features.

2. Description of the Background

According to the prior art, it is possible to produce black markings using laser labeling systems. Use is made of this in laser personalization, which is used as an economic method with high quality in many sectors and often also represents a security feature.

Furthermore, use is made of what are known as "UV colors" in security features. These "UV colors" are visible only to produce fluorescence or phosphorescence only when they are excited with UV light. They are present in printing inks or in fibers and are processed by various printing processes or added directly to the paper or plastic substrates.

One problem results from the fact that, in security technology, use is made of what are known as "UV colors" which, because of fluorescence or phosphorescence, are visible only under UV light, but the security features developed from this cannot be personalized. Instead, in the case of securities or plastic cards, for example, these features are present as printing or as an additive (fibers) in the paper or plastic.

SUMMARY

A method is therefore to be proposed with which laser markings on luminescent substances are possible, said markings being invisible under normal conditions but visible with the aid of a UV light source or another suitable excitation.

It is therefore an object of the invention to provide a method for laser marking of new luminescent authenticity features or markings in which the marking produced is invisible in the normal state but becomes visible with the aid of a UV lamp or via excitation in the electromagnetic field, as a negative luminescent image (fluorescent image or phosphorescent image).

The object is achieved by a method which provides for the active luminescent pigments or dyes to be bleached with the aid of a laser or another suitable energetic beam.

The invention therefore assumes a laser personalization of UV security features, for example in plastic cards, and combines the advantages of two methods, namely personalization by means of a laser beam and, moreover, the personalization of luminescent substances and their verification under UV light or another high-energy excitation medium.

The invention claims in general the personalization of luminescent authenticity features, no matter of what type, on any desired data carriers. Also claimed as essential to the invention is in general the personalization of chemiluminescent and bioluminescent substances. Therefore, in the following description, the main term "luminescence" is used as a synonym for all three luminous phenomena.

In a preferred embodiment as claimed by the invention, the data carrier described is a multilayer plastic card (for example in the form of a check card). However, the invention is not restricted to this. Only for reasons of simplicity is the structure of a check card used below for the further description of the invention.

Likewise, all possible incorporations and installation locations of the luminescent marking in a data carrier are claimed. The marking can therefore be printed as printing ink onto a specific layer or a plurality of layers of the data carrier or applied in another way. However, the marking can also be incorporated into the plastic polymer of one or more of layers of the data carrier. The luminescent substance can also be incorporated in the adhesive, the varnish or as an additive in the plastic material.

For further simplification, the term "UV color" is generally to be understood to mean a marking, substance or authenticity feature which produces luminous phenomena by utilizing photoluminescence and/or chemiluminescence and/or bioluminescence with the absorption of high-energy light (normally ultraviolet light). Within the context of the invention, it is preferred that the luminous phenomenon appears in visible light. However, the invention is not restricted to this. For the detection of the authenticity of check cards by machine, therefore, this luminous phenomenon can also be provided in the invisible spectral range and evaluated by machine. Likewise, the invention is not restricted either to excitation with UV light; excitation in an appropriate electromagnetic field can therefore also be provided, said field being suitable to cause the substance to luminesce (visibly or invisibly).

The various interactions between laser light and materials also include the bleaching of chromophoric substances. In this case, according to the invention, there is the possibility of destroying these chromophoric substances with the aid of a laser beam. For example, the body color of a substrate containing pigments changes from colored to white.

This process is used in the context of the present invention.

One basic precondition for this process is that the chromophoric substance absorbs the laser light and enters into a chemical reaction in which it loses its colored characteristics. In the simplest case, chemical degradation of the chromophoric substance takes place. In addition, the laser light should not excite any side reactions which lead to coloration of the substrate, and therefore do not effect bleaching to white.

The principle of bleaching with laser light may now, according to the invention, also be transferred to "UV colors", as they are known. These "UV colors" contain pigments or dyes which do not appear colored in the normal case or are only weakly colored but, as a result of UV absorption or other electromagnetic excitation, are excited to emit visible light.

The phenomenon is generally designated "cold illumination" or luminescence. Depending on the lifetime of the excited states, a distinction is drawn between fluorescence and phosphorescence, the emission taking place very quickly in the first case, but in the second place some post-luminescence also being observed following the UV excitation.

The term "UV colors" is used frequently, but is used misleadingly, in that most substances referred to in this way are not colored. In addition, the term "UV colors" is used in an inaccurate manner for UV-curing printing inks. In this case, the term UV does not refer to luminescent effects but the mechanism of the chemical curing during processing.

In the bleaching of "UV colors" according to the invention, destruction of the chromophoric substance by means of intensive laser light is carried out, analogous to the absorption colors. In this case, however, the substrate is not to be damaged in the visible range, nor is its colored impression to be changed. It is therefore necessary for a (UV) wavelength range (band in the invisible range) to be selected, and the intensity must be metered in such a way that the UV color itself is excited by the absorption and then breaks down, which corresponds to bleaching. In this way, bleaching with visible pigments would be made.

Since "UV colors" are not colored or only weakly colored under normal conditions, they absorb hardly any visible light. Therefore, ultraviolet light must be used for bleaching. In this case, a laser wavelength range which is absorbed particularly well by the "UV color" used must preferably be selected.

"UV colors" which are suitable for bleaching by UV laser radiation belong, for example, to the following classes of substances:

tin sulfide derivatives,
benzoxazinone derivatives,
pyrazoline derivatives.

For the purpose of bleaching the "UV colors", in addition to ultraviolet, infrared radiation and/or radiation of other wavelengths can also be used if the chromophoric substances absorb the respective radiation used in the corresponding spectral range without visible coloration of the chromophoric substances occurring.

In a simple embodiment of the invention, the substrate to be marked exhibits uniform luminescence. This is achieved by means of a uniform application of "UV printing inks" or by incorporating the "UV colors" in a polymer matrix. The substrate can then be marked with the aid of the laser by the "UV color" being locally bleached completely. In this way, for example, vector lines or halftone scanning images can be produced. Furthermore, there is the possibility of achieving partial bleaching by means of modulating the laser power and of generating gray-stage images.

In a further-reaching embodiment of the invention, even images printed with "UV colors" or other security features which contain "UV colors" can also be marked subsequently.

The subject of the present invention is not just given by the subject matter of the individual patent claims but also by the combination of the individual patent claims with one another.

All the statements and features disclosed in the documents, including the abstract, in particular the physical embodiment illustrated in the drawings, are claimed as essential to the invention if they are novel, individually or in combination, with respect to the prior art.

In the following text, the invention will be explained in more detail using drawings which merely illustrate one possible implementation. In this case, further features essential to the invention and advantages of the invention emerge from the drawings and their description.

In the figures:

DESCRIPTION

Figure 1:
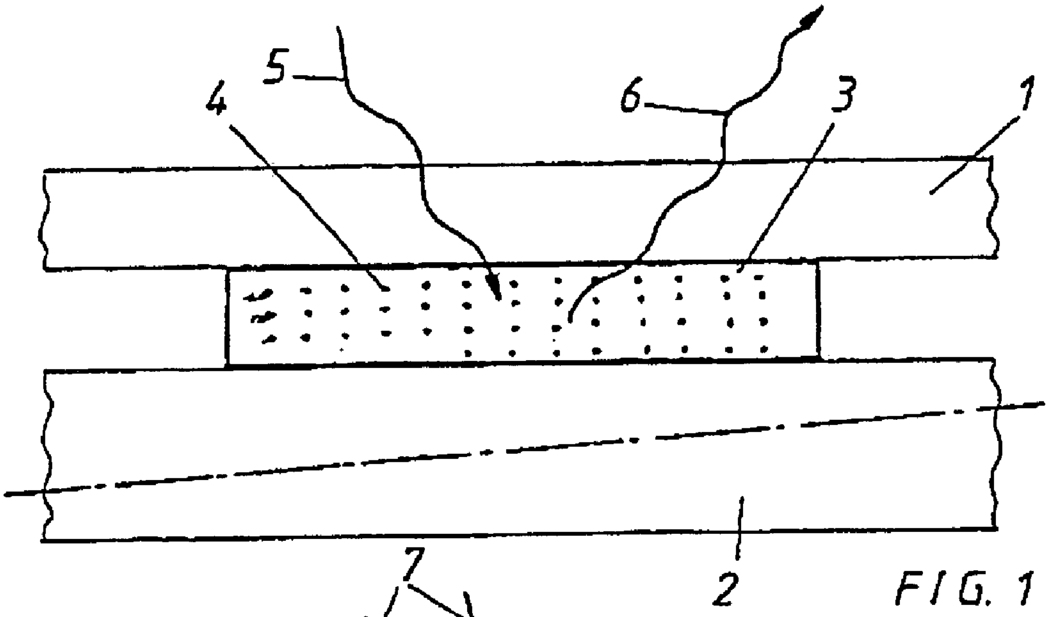
FIG. 1 shows a section through a card structure, illustrated in simplified form, the initial state of the method.

FIG. 1 shows a detail from a card structure in section, using size relationships that are not to scale. In this case, a luminescent authenticity feature 3 is arranged on a carrier film 2. When illuminated with UV light 5, for example, the structure 4 is excited in such a way that luminescence takes place, for example in visible light 6.

Figure 2:
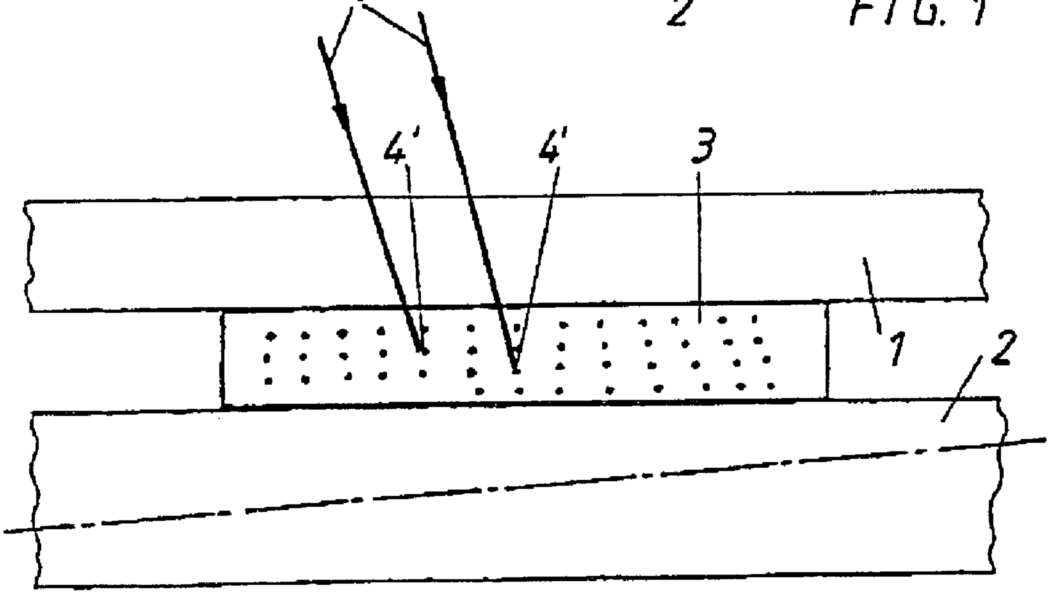
FIG. 2 shows a section through the card structure according to FIG. 1 with the action of a laser beam.
Figure 3:
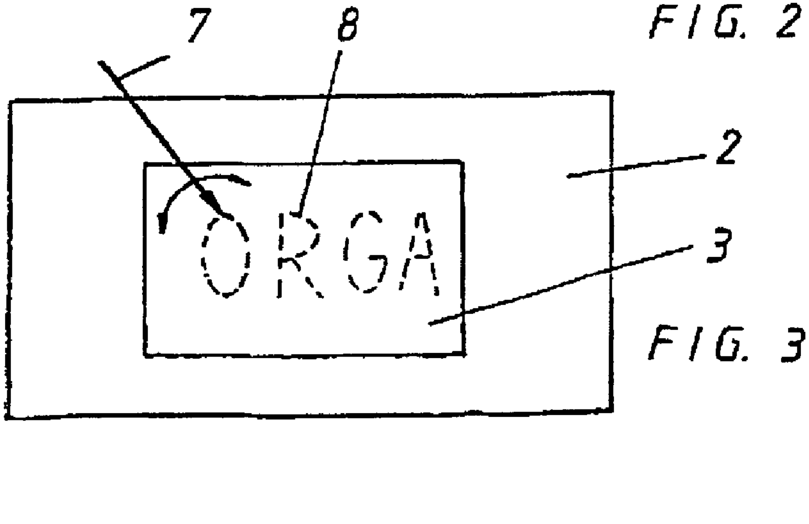
FIG. 3 shows, schematically, a plan view of the structure according to FIG. 2.
Figure 4:
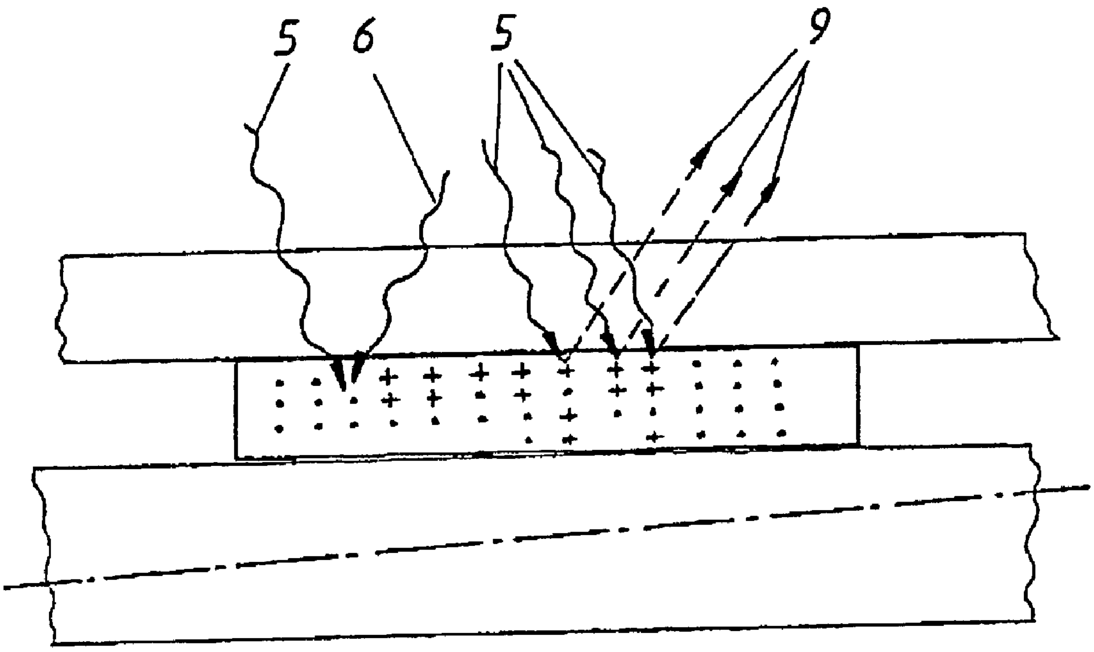
FIG. 4 shows the card structure according to FIGS. 2 and 3 when excited with high-energy light.

According to the invention, this authenticity feature 3 is now to be personalized. For this purpose, using a laser beam 7 (see FIGS. 2 and 3), for example a line of text 8 is to be written into the structure 4 of the authenticity feature 3. The intensity of the laser beam is chosen such that the structure 4 is transferred into the structure 4' only in the region of the action of the laser beam. In this case, the structure 4' is not intended to have any structure or color change that can be detected in visible light.

Figure 5:
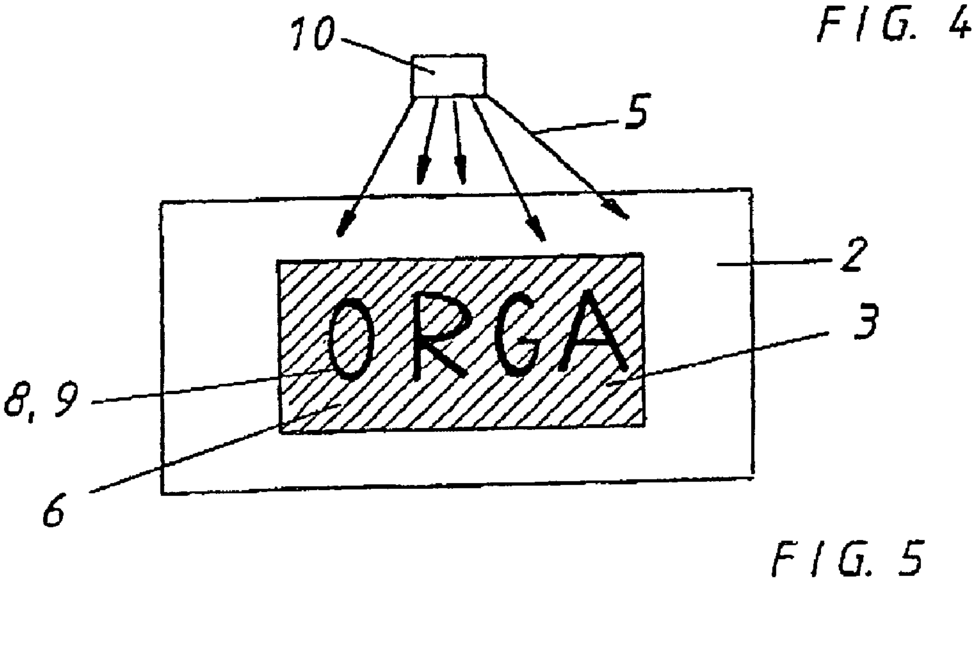
FIG. 5 shows a plan view of the card structure according to FIG. 4.

Only when irradiated with UV light 5 is the structure 4' (see FIG. 5) no longer to luminesce or to luminesce only weakly by luminescence; instead the intention is for only light 9 of a different color or even a negative image to appear in the overall luminescent image. The line of text 8 written in therefore does not luminesce at all or lights up only partly or in a different color from that of the surrounding region.

If the luminescence is chosen by choosing the intensity of the laser beam 7 such that only impairment of the luminescence but not extinction occurs, a halftone or gray-stage image to be detected as a line of text 8 even when irradiated with a UV lamp 10.

Of course, the exemplary implementation explained here is not to be viewed as restrictive of the range of protection. All the variants and modifications which have been described in the general part of the description apply. For example, irradiation with a UV lamp 10 is not required in order to make the authenticity feature 3 luminesce. Also sufficient is excitation with radiation of different wavelengths in the invisible spectral range and/or in an alternating electromagnetic field.

KEY TO DRAWINGS

1 Cover film
2 Carrier film
3 Authenticity feature
4 Structure
4' Changed structure
5 UV light
6 Radiated light
7 Laser beam
8 Line of text (personalization)
9 Radiated light
10 UV lamp

The invention claimed is:

1. A method of personalizing luminescent authenticity features on a data carrier comprising:

applying or incorporating a luminescent authenticity feature in a composite card;

personalizing the authenticity feature by bleaching with a high-energy beam; and modulating a parameter of the beam such that local bleaching of the structure of the authenticity feature takes place;

wherein the bleaching completely destroys at least a portion of a chromophoric substance of the luminescent authenticity feature, and the destruction cannot be detected in visible light.

2. The method as claimed in claim 1, further comprising modulating power of a laser beam in such a way that partial bleaching of the structure of the luminescent authenticity feature is achieved.

3. The method as claimed in claim 1, further comprising luminescing the luminescent authenticity feature under the action of an electromagnetic field.

4. A device for implementing the method as claimed in claim 1, wherein the high energy beam is a laser beam used for personalizing the luminescent authenticity feature.

5. The device as claimed in claim 4, wherein the luminescent authenticity feature is caused to luminesce by photoluminescence.

6. The device as claimed in claim 4, wherein the luminescent authenticity feature is caused to luminesce by chemiluminescence.

7. The device as claimed in claim 4, wherein the luminescent authenticity feature is caused to luminesce by bioluminescence.

8. The device as claimed in claim 4, wherein luminescence of the luminescent authenticity feature takes place in the visible spectral range.

9. The device as claimed in claim 4, wherein luminescence of the luminescent authenticity feature takes place in the invisible spectral range.

10. The device as claimed in claim 4, wherein the luminescent authenticity feature is excited by UV light.

11. The device as claimed in claim 4, wherein the authenticity feature is excited by IR radiation.

12. A device for implementing the method as claimed in claim 1, wherein the high energy beam is an electron or neutron beam used for the personalization.

13. The method as claimed in claim 1, wherein the data carrier is a plastic card.

14. The method as claimed in claim 1, wherein the parameter is the intensity of the high-energy beam.

15. The method as claimed in claim 1, wherein the parameter is the wavelength of the high-energy beam.

16. The method as claimed in claim 1, wherein the bleaching of the luminescent authenticity feature is configured to be irreversible.

17. A method of personalizing luminescent authenticity features on a data carrier comprising:

applying or incorporating a luminescent authenticity feature in a composite card;

personalizing the authenticity feature only by bleaching with a high-energy beam such that the bleaching completely destroys at least a portion of a chromophoric substance of the luminescent authenticity feature, and the destruction cannot be detected in visible light; and modulating a parameter of the beam such that local bleaching of the structure of the authenticity feature takes place.

* * * * *